United States Patent [19]

Schneider

[11] 4,134,048
[45] Jan. 9, 1979

[54] CONTROL ARRANGEMENT FOR A WHEEL SLIP SYSTEM
[75] Inventor: Joseph D. Schneider, Erie, Pa.
[73] Assignee: General Electric Company, Erie, Pa.
[21] Appl. No.: 844,259
[22] Filed: Oct. 21, 1977
[51] Int. Cl.² ............................................. H02P 15/00
[52] U.S. Cl. ........................................ 318/52; 318/480
[58] Field of Search ....................... 318/52, 480; 105/61

[56] References Cited
U.S. PATENT DOCUMENTS

| | | | |
|---|---|---|---|
| 3,930,189 | 12/1975 | Smith | 318/52 |
| 3,982,164 | 9/1976 | de Buhr | 318/52 |

Primary Examiner—B. Dobeck
Attorney, Agent, or Firm—J. H. Beusse

[57] ABSTRACT

A wheel slip correction system of the type in which boost current is supplied to the field winding of a d-c electric traction motor driving a slipping wheel from an a-c source in order to correct the slip is provided with a control system which automatically inhibits the application of boost current if control power fails. A current transformer connected to provide power to the field winding from the a-c source has a secondary winding normally short-circuited by inversely paralleled thyristors thus inhibiting power transfer to the field winding. The thyristors are maintained short-circuited by a current amplifier connected across the transformer secondary and adapted to normally supply current to the gate terminals of the thyristors. The current amplifier is inhibited by receipt of a wheel-slip signal so that the thyristors remain non-conductive and boost current is supplied to the motor field. In a preferred embodiment, low voltage wheel slip detection circuits are isolated from the current amplifier through the use of optical couplers.

5 Claims, 5 Drawing Figures

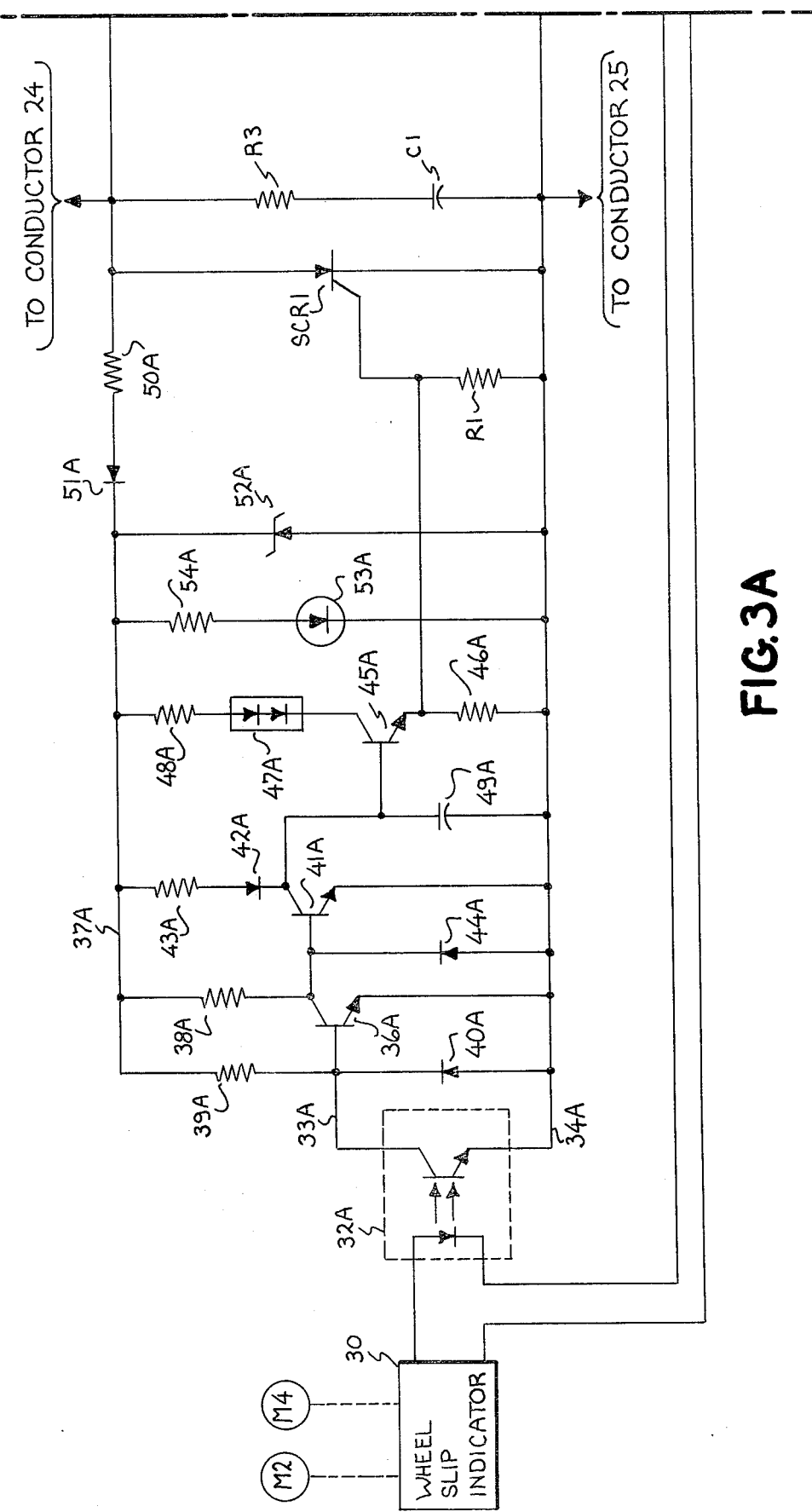

CONTROL ARRANGEMENT FOR A WHEEL SLIP SYSTEM

BACKGROUND OF THE INVENTION

This invention relates to an improved wheel slip control system for electrically propelled vehicles.

In U.S. Pat. No. 3,930,189 issued Dec. 30, 1975 to Russell M. Smith and assigned to the General Electric Company, there is described a wheel slip system for use in a traction vehicle employing an alternating current supply and series-type direct current electric traction motors. A power rectifier converts the alternating current to direct current for the supply of normal direct current excitation to the armatures and fields of the motors. A current transformer has a primary winding serially connected in the alternating current path between the alternating current supply and the power rectifier. A secondary winding of the current transformer is connected to a secondary rectifier circuit which rectifies the current produced by the current transformer and couples it to field windings of the traction motors. The current from the current transformer is of such polarity that upon application to the field windings, the summation of the normal excitation current and the current transformer current maintains the total current in the field windings at a substantially constant value or at a value only slightly less than the value of current flowing prior to the occurrence of a wheel slip.

When a wheel slip occurs, the increased rotational velocity of the motor armature connected to the slipping wheel causes an increase in the counter electromotive force (CEMF) or voltage drop across that motor armature. Since the difference between the CEMF and the source voltage determines the magnitude of armature current, the increase in CEMF forces a reduction in armature current and, due to the series connection of armature and field windings, a similar reduction in field current. The reduction in field current tends to cause a reduction in CEMF which is compensated by an increase in armature velocity. This process of increasing armature velocity with attendant reduction in field current will continue until the motor torque is just balanced by the force exerted on the wheel. The wheel slip will be self-corrected by the motor if a sufficient frictional force between wheel and tractive surface is experienced. The system in the aforementioned U.S. Pat. No. 3,930,189 corrects a wheel slip by boosting field current so that motor armature CEMF is rapidly increased to a level which substantially reduces armature current. Since motor torque is proportional to the product of armature current and field current, the rapid reduction in armature current is such that the motor torque falls below the value necessary to maintain the wheel slip condition. Thus, the wheel is rapidly forced to re-adhere to the tractive surface.

Since it is not desirable to supply the additional current, i.e., boost current, from the current transformer when the wheels are not slipping, the secondary winding of the current transformer is maintained in a short circuited condition until a wheel slip occurs.

In the patented system the secondary winding is effectively short-circuited by semiconductor devices such as thyristors (SCR) or transistors. A wheel slip detector circuit supplies signals to maintain conduction of the short-circuiting semiconductor devices so that the devices are turned off (non-conducting) only upon detection of a wheel slip condition of the wheels that are being driven by the traction motor whose series field is coupled to the associated secondary winding. Accordingly, it can be seen that the wheel slip detector provides continuous gating signals which are interrupted upon the detection of a wheel slip condition. In the event of a failure of the wheel slip detector to supply gating signals, which failure may result from a component or power loss, the short-circuiting devices will not be gated into conduction and boost current will be supplied to the motor field windings. Such a result is undesirable since it will reduce the torque of the boosted motors and reduce the tractive effort of the driven wheels.

OBJECT OF THE INVENTION

It is an object of my invention to provide an improved motor field boost current control system which reduces the potential for undesirable application of field boost current.

It is a further object of my invention to provide an improved motor field boost current control system which inhibits the application of field boost current upon a loss of control system power.

SUMMARY OF THE INVENTION

My invention provides apparatus for controlling the application of boost current to the field winding of an electric traction motor in such a manner that a control power failure will inhibit the application of boost current. In particular, I provide a current amplifier circuit which is connected to normally supply gate drive current to a pair of semiconductor devices. The semiconductor devices are connected in inversely-poled parallel relationship across a secondary winding of a current transformer. The current transformer and semiconductor devices are interconnected with the series field of a traction motor in the manner taught in the above-referenced Smith patent. The current amplifier is connected in parallel with the semiconductor devices so as to be supplied with power from the secondary winding across which the semiconductor devices are connected. The current amplifier is biased in a normally conductive mode whereby in the absence of an inhibiting wheel slip signal, current is supplied to gate terminals of the paired semiconductor devices and the devices are alternately turned on during successive half-cycles of the secondary winding voltage to virtually short-circuit the associated current transformer. The current amplifier circuit is adapted to respond to a wheel slip signal by inhibiting gate drive current to the semiconductor devices thus allowing them to be turned off whereby boost current is supplied to the motor field winding. Since the current amplifier draws its power from the secondary winding of the current transformer and is biased to normally provide gate drive to the semiconductor devices, my invention eliminates the requirement for an external source of gate drive current and is therefore not subject to misoperation if such external source were to fail. In a preferred embodiment an optical coupler is utilized to couple the wheel slip signal from the wheel slip detector to the current amplifier. The use of the optical coupler isolates the low voltage detection circuit from the relatively high voltage present at the motor field windings.

DESCRIPTION OF THE DRAWINGS

For a better understanding of the objects and features of my invention, reference may be had to the following detailed description taken in conjunction with the accompanying drawings in which:

FIG. 3 illustrates the connection of FIGS. 3A and 3B.

FIGS. 3A and 3B in combination form a schematic diagram of the embodiment of my invention illustrated in FIG. 2.

DETAILED DESCRIPTION OF THE EMBODIMENT

Figure 1:
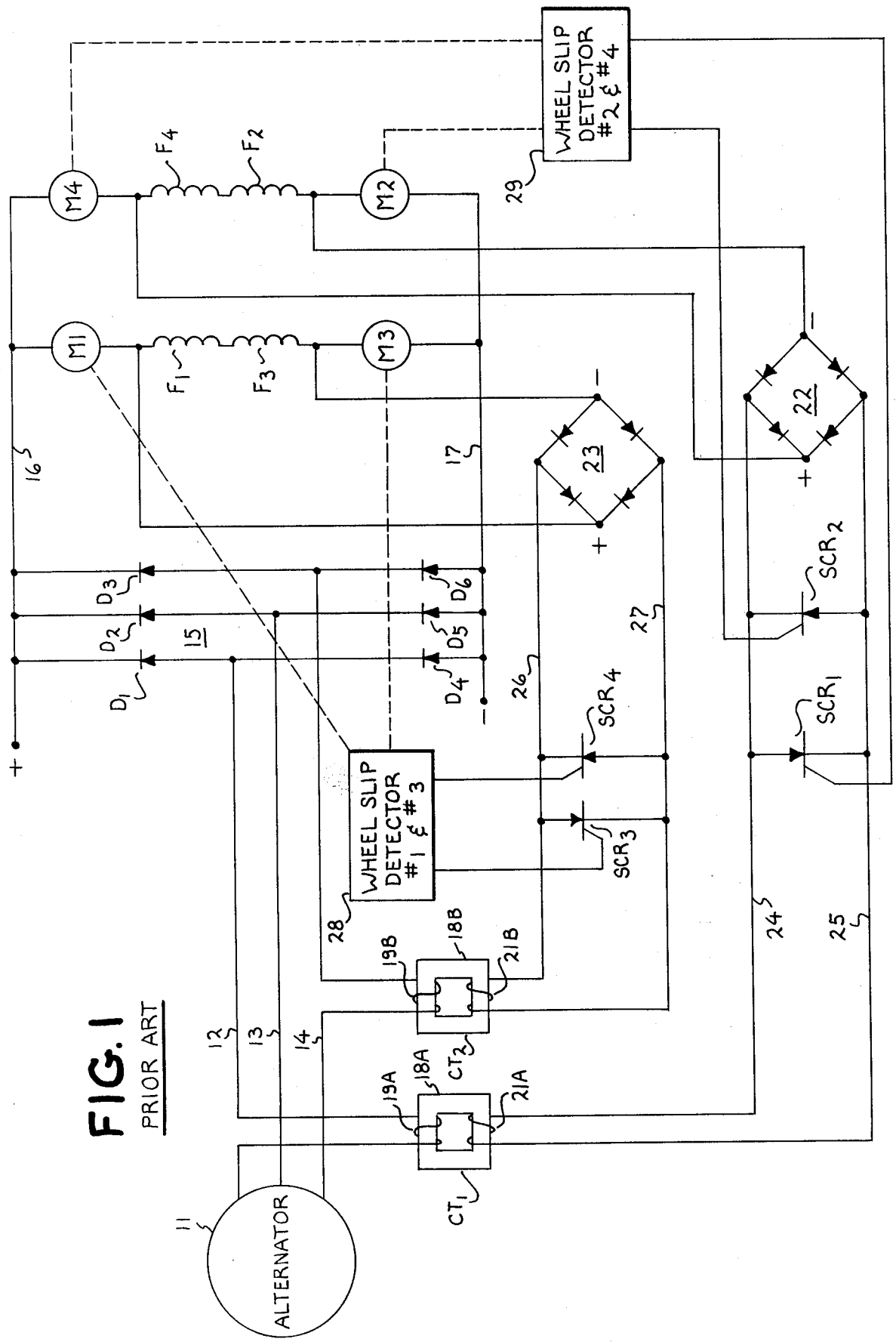
FIG. 1 is a functional block diagram of a prior art electrical traction motor system including a wheel slip control system with which my invention is particularly advantageous.

Referring now to FIG. 1, there is shown a functional block diagram of a prior art electrical traction motor system including a wheel slip correction system. In this system, a conventional, large, power rated three-phase alternator which may be of the type generally found in diesel electric locomotives and like equipment is shown at 11. The alternator 11 supplies variable voltage, three-phase alternating current electric power via conductors 12, 13, and 14 to a three-phase, full wave rectifier bridge 15 comprising the diode rectifiers D1 through D6. The diode rectifier bridge at 15 is connected to a pair of direct current (d-c) power supply buses 16 and 17 for supplying full wave rectified current to a plurality of d-c electric traction motors having armatures indicated at M1 through M4 and corresponding field windings indicated at F1 through F4.

The traction motors are connected in a series field arrangement wherein each armature winding indicated at M1, M2, M3 and M4 is connected in a series electrical circuit relationship with its corresponding field winding F1, F2, F3 and F4. In the series-parallel traction drive arrangement shown in FIG. 1, the motor armature M1 and its associated series connected field winding F1 is connected in series circuit relationship with the series field winding F3 and armature M3, and the series circuit thus comprised is connected between the direct current power supply buses 16 and 17.

For convenience and simplicity of illustration, the usual control features normally associated with traction motor drive systems have not been illustrated since they do not comprise a part of the present invention, such control features being well known to those skilled in the art.

The wheel slip correction system includes a pair of current transformers CT1 and CT2 whose primary windings are connected, respectively, in the conductors 12 and 14 between alternator 11 and the diode rectifier bridge 15. Each of the current transformers comprises a core member 18, a primary winding 19, and a secondary winding 21. For ease of illustration, the components associated with transformer CT1 are identified with an A suffix and the components associated with transformer CT2 are identified with a B suffix.

Each of the current transformer secondary windings 21A and 21B is connected across diagonally opposed input terminals of a respective auxiliary diode rectifier bridge 22 and 23. Diagonally opposed output terminals of the respective auxiliary rectifier bridges 22 and 23 are connected to distal terminals of the series connected traction motor field windings F2 and F4 and the series connected traction motor field windings F1 and F3, respectively. The polarity of the connection of the auxiliary diode rectifier bridges 22 and 23 is such that when the rectifier bridges conduct, they supply an auxiliary direct current which is circulated through the respective sets of field windings F2, F4 and F1, F3 in an aiding direction. More particularly, under normal conditions the same armature and field current circulates through the respective series connected traction motor armature M1 and field winding F1 and thereafter through field winding F3 and armature M3 in series between the direct current power supply buses 16 and 17. The auxiliary current supplied through the auxiliary rectifier bridge 23 augments or adds to the field current flowing in the field windings F1, F3 under the conditions to be described hereafter. A similar connection is provided for the auxiliary field current fed to the field windings F4 and F2 from the auxiliary diode rectifier bridge 22.

The current transformer secondary windings 21A and 21B have their outputs connected to the diagonally opposed input terminals of their respective auxiliary rectifier bridges 22 and 23 through conductors 24, 25 and conductors 26, 27 respectively. Controllable semiconductor devices, illustrated as inversely poled, parallel connected thyristors or silicon controlled rectifiers SCR1, SCR2, SCR3 and SCR4, are connected across the secondary windings 21A and 21B. The thyristors SCR1 and SCR2 are connected across secondary winding CT1 and the thyristors SCR3 and SCR4 are connected across secondary winding CT2. The thyristors SCR1, SCR2, SCR3 and SCR4 provide a means for short-circuiting the secondary windings CT1 and CT2 to inhibit the transfer of boost current to the motor field windings. Thyristors SCR1 and SCR2 have their control terminals or gates connected to output terminals of a wheel slip detector 29 which is operably connected to the motor armatures M2 and M4. Thyristors SCR3 and SCR4 have their control terminals or gates connected to output terminals of a wheel slip detector 28 which is operably connected to the motor armatures M1 and M2.

The wheel slip detectors 28 and 29 may comprise conventional means for detecting a wheel slippage condition of any one of the traction motors M1 through M4. For example, these devices may comprise tachometer generators, voltage measuring bridges, or other types of wheel slip detectors, examples of which are described in greater detail in U.S. Pat. No. 3,737,745, issued June 5, 1973 to Russell M. Smith and Rene J. Chevaugeon for a wheel slip control system, and assigned to the General Electric Company. Wheel slip detection circuits suitable for use with the present invention are also shown in U.S. Pat. No. 3,093,399, issued to D. I. Smith on June 11, 1963 and assigned to the General Electric Company. The connection of the wheel slip detectors to the respective short circuiting thyristors SCR1, SCR2, SCR3 and SCR4 is such that the thyristors are normally conducting in the absence of a wheel slippage condition. Upon the occurrence of a wheel slip condition in either of the series connected motors of a set, the associated short circuiting thyristors will have the gate signal removed therefrom so that they assume a current blocking (a non-conducting) condition. In this condition the thyristors become open circuited and any voltage appearing across the secondary windings 21A and 21B will be supplied across the diagonally opposed terminals of the corresponding auxiliary rectifier bridge 22 and 23 and will result in the supply of an auxiliary field current to the series connected field windings F1, F3 and F2, F4.

In operation, the illustrated wheel slip correction system boosts or increases the field current of a series type traction motor detected to be slipping so that the CEMF of the slipping motor is rapidly increased. Consequently, armature current, which is regulated by the difference between the CEMF and the applied motor voltage, rapidly decreases resulting in a substantial reduction in the torque produced by the slipping motors. This torque reduction then allows the slipping wheel to regain its tractive relationship with a roadway. Thus, after a wheel slip is detected, the field current of the slipping traction motor is either increased so that the torque of the motor falls off even more rapidly than a comparable shunt motor, or as a wheel slip occurs, the field current of the slipping motor is allowed to decay but at a rate which is less than that of the armature current. In other words, the auxiliary field current introduced from the auxiliary power supply keeps the field current well above the armature current but still allows it to decrease. This results in slowly decreasing the tractive effort of the slipping motor so that it is self-correcting without requiring the removal of large amounts of power from the entire traction motor drive system, or from other non-slipping traction motors.

In the system of FIG. 1, the traction motors are arranged in a series-parallel relationship and the field windings of any two series connected motors are simultaneously boosted when either of the two motors experiences a slipping condition. Although it would be suitable to boost only the field of the motor driving the slipping wheel, it will be apparent that boosting the field of all the series connected motors will result in a more rapid reduction in armature current and consequently a more rapid reduction in motor torque so that the slipping condition is more rapidly overcome. Furthermore, as is described in the above-cited U.S. Pat. No. 3,093,399, a wheel slip detector is typically associated with each driven wheel of a vehicle.

During normal operation the current flowing through the series connected armature and field windings of a traction motor such as that illustrated in FIG. 1 may be in the range of 800 to 1200 amperes. In order to rapidly increase the CEMF of the armature to a level sufficient to force such high motor currents down so that motor torque is reduced, it is necessary to supply relatively large magnitudes of auxiliary field current. For example, auxiliary field current may approach values in the range of 600 amps. At the same time, the inductive reactance of the motor field windings may cause a voltage transient of 400 volts peak to appear across the field windings. Accordingly, the prior art systems have required that the auxiliary current supply circuit comprise components capable of controlling relatively high power for supplying continuous gating signals to the power semiconductor devices. Control components having such power and capability tend to be economically undesirable.

Figure 2:
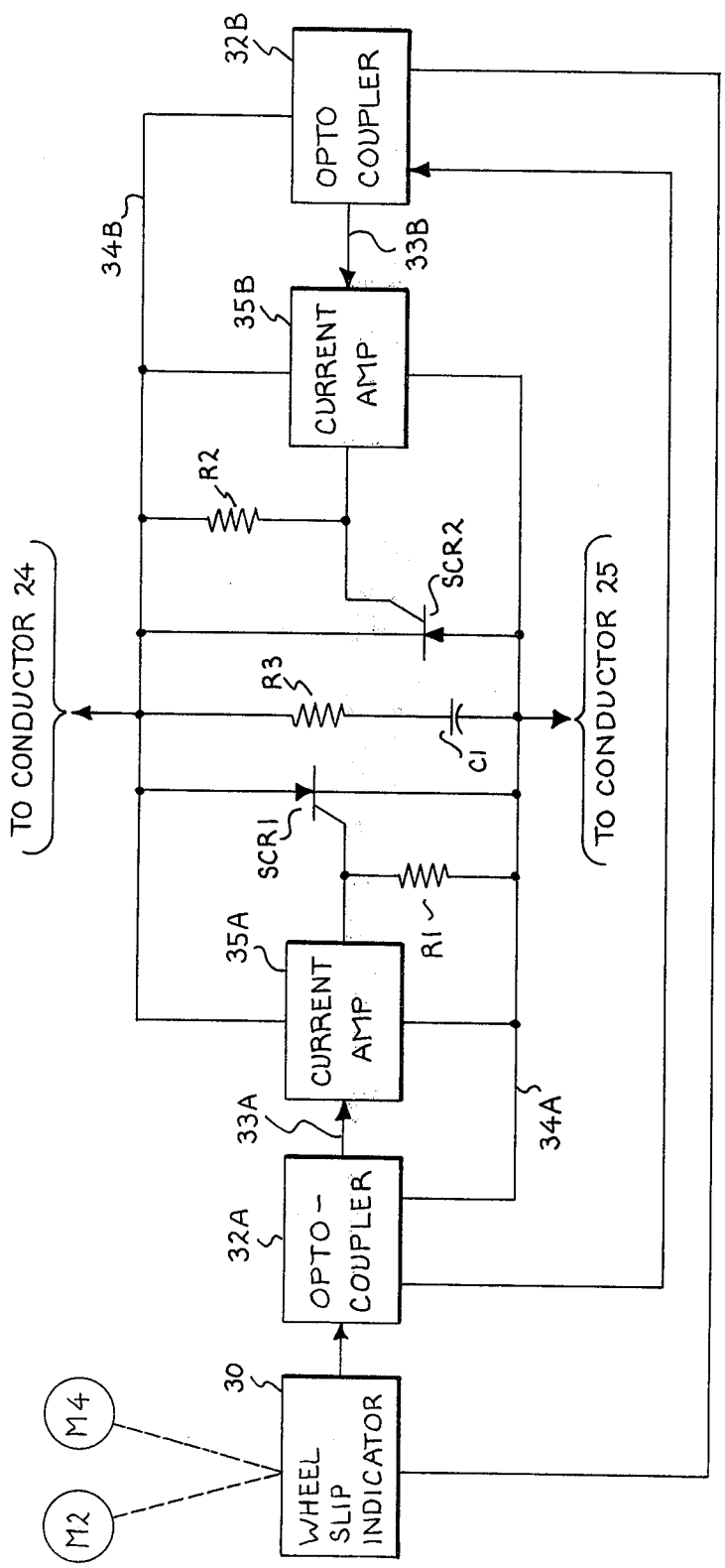
FIG. 2 is a block diagram of a preferred embodiment of my invention.

Referring now to FIG. 2 there is illustrated a preferred embodiment of my invention in which the wheel slip detecting circuitry is isolated from the high power control circuit for the short circuiting thyristors and the thyristors are essentially self-firing. For purposes of illustration, only the control circuitry associated with thyristors SCR1 and SCR2 is shown, it being understood that the control circuit for thyristors SCR3 and SCR4 comprises identical circuitry. For ease of description, thyristors SCR1, SCR2, SCR3 and SCR4 will hereinafter be referred to simply as SCR1, 2, 3, or 4. With the exception of SCR1 and SCR2, the circuitry illustrated in FIG. 2 is that contained within the wheel slip detector 29 of FIG. 1. A wheel slip indicator 30 is connected to monitor the wheel or axle associated with the armature M2 and the wheel or axle associated with the armature M4. The wheel slip indicator 30 is preferably of the type described in the aofrementioned U.S. Pat. No. 3,093,399. The indicator 30 is adapted to provide an output signal when a wheel slip condition is detected. As described in the Smith patent, the wheel slip indicators for all the wheels of a vehicle are preferably interconnected such that compensation for wheel size differentials may be accomplished and a wheel slip indication can be detected as a variation from the average velocity of all of the wheels on the vehicle.

The control circuitry for SCR2 is identical to that for SCR1. Accordingly, the following description will cover only the control circuitry associated with SCR1, those elements being identified with an "A" suffix and the corresponding elements in the control circuitry for SCR2 being identified with the same number and a "B" suffix.

The wheel slip signal developed by wheel slip indicator 30 is applied to the series combination of optical coupler 32A and 32B. The couplers 32A and 32B serve to isolate the circuitry within the wheel slip indicator 30 from the actual power circuitry applying the gating signals to SCR1 and SCR2. Optical couplers suitable for this application are well known in the art. A first output terminal of optical coupler 32A is connected via a line 34A to the cathode terminal of SCR1 which is also connected to the conductor 25 identified in FIG. 1. A second output terminal of optical coupler 32A is connected via a line 33A to an input terminal of a current amplifier 35A. The current amplifier 35A is connected to supply gating signals to SCR1. The anode terminal of SCR1 is also connected to the current amplifier 35A. This connection provides power to current amplifier 35A from the conductor 24. (The current amplifier 35B associated with SCR2 is adapted to receive power from the conductor 25.) The purpose of supplying power from the anode of an SCR to its associated current amplifier 35 is to allow a gating signal to be generated whenever a voltage is present across the SCR. In the implementation of the current amplifier 35, the circuitry is adapted to provide gating signals to the gate terminals of SCR1 or SCR2 whenever voltage is present on the corresponding SCR anode. A wheel slip indication provided through the optical coupler 32 disables or inhibits the production of gating signals by the amplifier 35 and allows the associated SCR to remain in a non-conducting condition whenever a wheel slip is occurring.

Similar circuitry is also associated with SCR1 and SCR2. Resistors R1 and R2 are connected between the gate and cathode terminals of SCR1 and SCR2, respectively, to prevent triggering of the thyristors on noise. A series combination of a resistor R3 and capacitor C1 is connected between anode and cathode terminals of thyristors SCR1 and SCR2 in order to limit the dv/dt voltage at turn-off to prevent refiring of the thyristors.

Figure 3B:
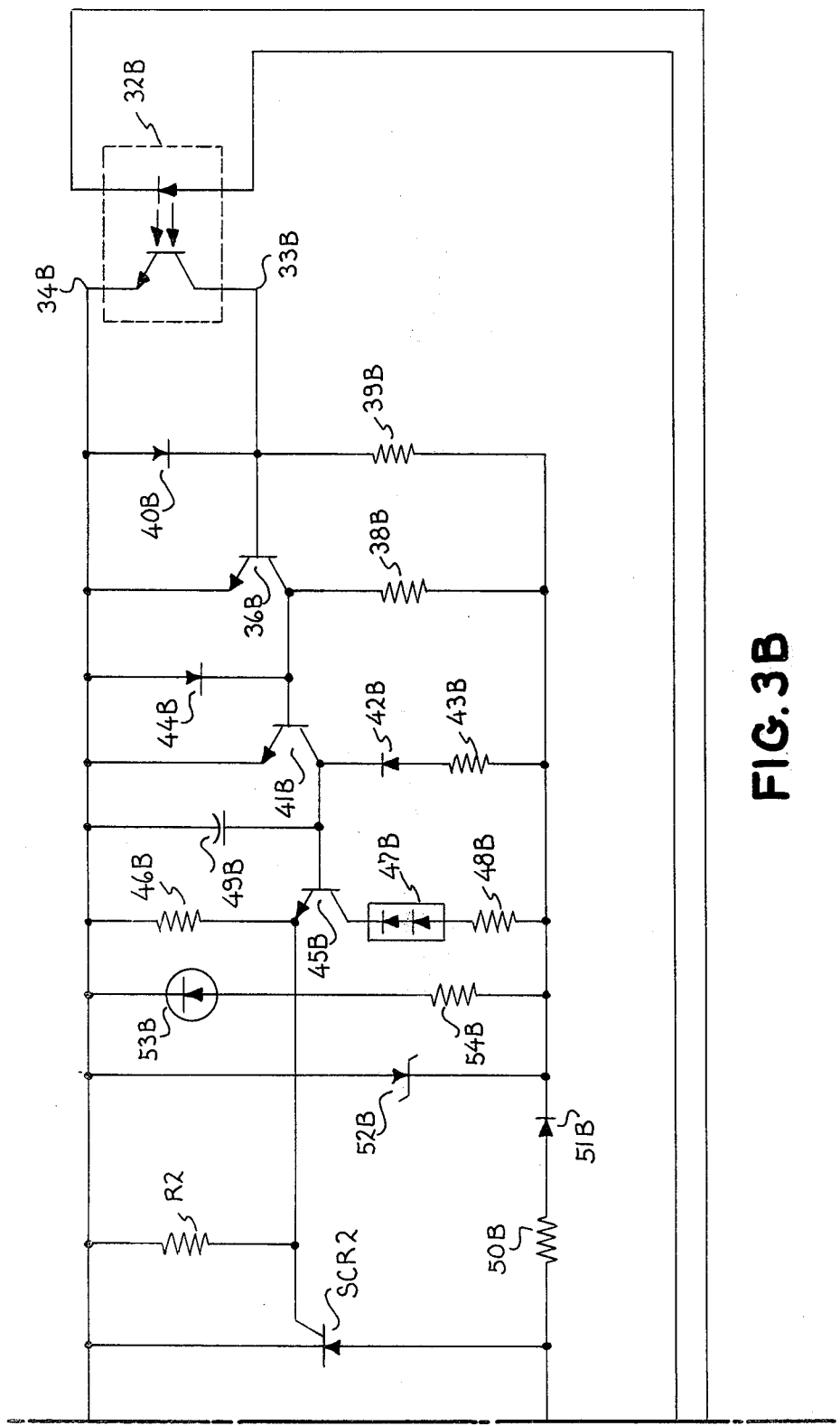

For a better understanding of the control system illustrated in FIG. 2, reference is now made to the detail schematic of FIGS. 3A and 3B. Hereinafter reference to FIG. 3 will be understood to mean the reference to the schematic diagrams of FIGS. 3A and 3B. As can be seen the optical coupler 32A is of the type adapted to provide a short circuit between the lines 33A and 34A whenever a signal is applied to its input terminals. The optical coupler 32B is clearly an identical device with identical function. The current amplifiers 35A and 35B are preferably three stage amplifiers, the last stage of which is an emitter follower current driver. The first stage of amplifier 35A comprises a transistor 36A having its base terminal connected to the line 33A and its collector terminal connected to a reference bus 37A through a resistor 38A. A base bias resistor 39A connects the base terminal of transistor 36A to the reference bus 37A. A diode 40A connected from the emitter terminal of transistor 36A to its base terminal protects the transistor from reverse voltage transients. Transistor 36A operates essentially as a switching device which can be maintained in a non-conducting condition whenever the optical coupler 32A short circuits the lines 33A and 34A thus short circuiting the base emitter junction of transistor 36A. When transistor 36A is conducting, i.e., whenever the optical coupler 32A is open circuited, a signal is coupled from the collector terminal of transistor 36A to a base terminal of a second switching transistor 41A.

The transistor 41A has a collector terminal connected through a diode 42A and a resistor 43A to the reference bus 37A. An emitter terminal of transistor 41A is connected to the cathode terminal of SCR1. A diode 44A interconnects the emitter and base terminals of transistor 41A to protect the base emitter junction from reverse transient voltages.

The collector terminal of transistor 41A is connected to a base terminal of an emitter follower transistor 45A. Transistor 45A provides the final stage of current amplification for driving the gate terminal SCR1. An emitter terminal of transistor 45A is connected to the cathode terminal of SCR1 through a resistor 46A. A collector terminal of transistor 45A is connected to the reference bus 37A through a diode 47A and a series connected resistor 48A. A capacitor 49A is connected between the base terminal of transistor 45A and the cathode terminal of SCR1 to assure that transient voltage appearing at the collector of transistor 41A will not cause transistor 45A to be prematurely turned off such that gating signals to SCR1 are undesirably interrupted. The emitter terminal of transistor 45A is connected directly to the gate terminal of SCR1 providing the necessary gate current to initiate conduction of SCR1.

The reference bus 37A is supplied with current and voltage from the conductor 24 which is connected to the secondary winding 21A of current transformer CT1. The connection between bus 37A and conductor 24 is via the series combination of a resistor 50A and a diode 51A. The resistor 50A provides a current limiting effect while the diode 51A blocks the application of reverse current to the current amplifier 35A. In a preferred embodiment the magnitude of the voltage developed between the cathode terminal of SCR1 and the reference bus 37A is limited by zener diode 52A connected between these two reference points. Furthermore, a light emitting diode 53A and a series connected resistor 54A are connected in parallel with the zener diode 52A to provide a visual indication whenever voltage is applied between the bus 37A and the cathode terminal of SCR1, thus indicating a non-conducting condition of SCR1.

As can be seen the control circuit for SCR2 is identical to the control circuit for SCR1 and a detailed description of such control circuit may be had by substitution of a "B" suffix for the "A" suffix in the preceding description.

In operation the current amplifier 35A serves to gate SCR1 into conduction so long as a wheel slip signal is not produced by wheel slip indicator 30. Assuming, for purposes of discussion, that SCR1 controls a positive half cycle of the a-c waveform from the secondary winding of CT1, as the voltage waveform increases in a positive direction a current is supplied through the resistor 50A and diode 51A to reference bus 37A. From the reference bus 37A current is supplied through the resistor 39A to the base terminal of transistor 36A. At the same time current is similarly supplied through the resistor 38A to the collector terminal of transistor 36A. Without a wheel slip signal the optical coupler 32A represents an open circuit and the transistor 36A is forward biased by the current applied through resistor 39A. Accordingly, transistor 36A is conductive and the base terminal of transistor 41A is short circuited to the potential at its emitter terminal which is connected to the common bus at the cathode of SCR1. Thus, transistor 41A is maintained in a non-conducting condition. With transistor 41A non-conducting a bias is supplied through the resistor 43A and diode 42A to the base terminal of transistor 45A. As soon as the capacitor 49A is charged sufficiently to allow a bias to appear on the base terminal of transistor 45A, this latter transistor becomes conductive. With transistor 45A conducting, a current is supplied through its collector resistor 48A, the series connected diode 47A and the transistor itself to the gate terminal of SCR1. This current forward biases SCR1 causing it to be gated into conduction.

Once SCR1 is gated into conduction, conductor 24 is short circuited through SCR1 to conductor 25 thus short circuiting the secondary winding 21A of current transformer CT1. Although this short circuiting serves to remove the voltage from the bus 37A thereby disabling the current amplifier 35A, as is well known SCR1 will remain in conduction so long as the current continues to flow through it. Accordingly, the absence of a gating signal does not cause SCR1 to be rendered non-conductive. In the illustrative embodiment SCR1 will remain conductive until the polarity of the voltage applied between conductor 24 and conductor 25 has reversed and current no longer flows through SCR1.

When the voltage applied between conductors 24 and 25 reverses and SCR1 has ceased conducting, the negative half-cycle of the a-c waveform will cause current to be applied through the resistor 50B and diode 51B to the current amplifier circuit 35B which controls the gating signals applied to SCR2. Thereafter the operation of SCR2 will follow the pattern of operation described above with respect to SCR1.

If during a first positive half-cycle of voltage applied between conductor 24 and conductor 25, a wheel slip signal is generated by wheel slip indicator 30, current will be applied to the optical couplers 32A and 32B and result in short-circuiting the line 33A and to the line 34A and the line 33B to the line 34B. Although the short-circuiting of line 33A to line 34A will cause transistor 36A to be placed in a non-conductive condition, during this first positive half-cycle SCR1 will have been conducting and cannot be turned off by removal of the current signal applied to its gate terminal. Accordingly, SCR1 continues to conduct during this first positive half-cycle. However, during a second half-cycle of the a-c voltage waveform when the voltage between conductor 24 and conductor 25 has reversed so that SCR1 ceases conducting, the effect of short-circuiting the base emitter junction of transmitter 36A will prevent a subsequent gating signal from being applied to the gate terminal of SCR1 on the next succeeding positive half-cycle of the a-c voltage between conductor 24 and conductor 25. Furthermore, since the line 33B is short-circuited to the line 34B through the optical coupler 32B, during this second half-cycle the transistor 36B will be maintained non-conductive with the result that the production of a gating signal for SCR2 will be inhibited and this latter thyristor will remain non-conductive.

To proceed in detail through the current amplifier 35A, it can be seen that once the base emitter junction of transistor 36A is shorted, this transistor will remain in a non-conductive condition and a voltage will be applied from the collector terminal of transistor 36A to the base terminal of transistor 41A. This will result in gating transistor 41A into conduction and thus short-circuiting the base of transistor 45A to the cathode terminal of SCR1. Transistor 45A will therefore maintain in a non-conductive condition. With transistor 45A non-conductive, no current is available at its emitter terminal to be supplied to the gate terminal of SCR1 and this SCR thus will not be gated into conduction. Of significance in the inventive circuit is the fact that the absence of a wheel slip signal applied to the optical coupler 32 results in a gating signal being applied to the gate terminal of the short-circuiting SCR1. This arrangement in essence provides a type of fail-safe condition in that a failure of the wheel slip indicator 30 will not inhibit the application of gating signals to the SCR's which short-circuit the transformer secondary windings. This type of arrangement assures that the traction motors will not be operated in a field boost condition if the wheel slip indicators fail.

Although the inventive system has been illustrated in what is presently considered to be the best mode, it will be apparent to those skilled in the art that the wheel slip indicator could be adapted to provide an error signal proportional to the degree of wheel slipping. In such a system the error signal could be applied to an a-c synchronizing circuit which would then allow the wheel slip signals to be applied to the optical coupler 32 and current amplifier 35 in a manner to phase control the conduction of the short circuiting SCR's. Thyristor phase control systems which could be adapted to this function are illustrated in the *SCR MANUAL*, 5th Edition, published in 1972 by the General Electric Company, Semiconductor Products Dept., Syracuse, N.Y. 13201. A typical phase control operation would force the SCR's to be non-conductive initially and then to be gated into conduction during some portion of the a-c waveform. This type of arrangement would therefore provide continuous control of the magnitude of boost current applied to the field windings of the traction motors. However, the present embodiment has been found to adequately eliminate wheel slips by applying the maximum available boost current to the field windings whenever a wheel slip above a threshold level is detected.

A further modification of the present invention is also envisioned in which a single current amplifier 35 may be adapted to control both of the inverse parallel connected short-circuiting thyristors.

While I have shown and described what is presently considered to be the best mode of my invention by way of illustration, other modifications will no doubt occur to those skilled in the art. I therefore intend herein to cover all such modifications that fall within the true spirit and scope of the invention.

What I claim as new and desire to secure by Letters Patent of the United States is:

1. In a traction vehicle adapted to be powered from a source of alternating current and including a plurality of direct current electric traction motors each having serially connected armature and field windings, the motors being connected in driving relationship to a corresponding plurality of wheel and axle assemblies of the vehicle, rectifying means interposed between the alternating current source and the traction motors for converting the alternating current to direct current, a current transformer having a primary winding and at least one secondary winding, the primary winding being serially connected between the alternating current source and the rectifying means, means for selectively coupling the secondary winding in current supplying relationship to the field winding of at least a first one of the traction motors for supplying auxiliary current to that field winding during a wheel slip condition of the wheels driven by said first motor, the coupling means comprising auxiliary rectifying means for converting the auxiliary current from alternating current form to direct current form, controllable semiconductor means connected for selectively short-circuiting the transformer, and wheel slip detector means for sensing a wheel slip condition of the wheels driven by said first motor and for producing a wheel slip signal in response thereto, the improvement comprising:

(a) amplifying means connected across said controllable semiconductor means and normally operative when the magnitude of voltage thereacross exceeds a relatively small threshold level to supply gating signals that maintain said semiconductor means in a substantially continuously conducting state whereby said current transformer is short circuited; and (b) connecting means disposed between said wheel slip detector means and said amplifying means for inhibiting operation of said amplifying means and thereby terminating said gating signals in response to the production of said wheel slip signal, whereupon said controllable semiconductor means reverts to a non-conducting state and auxiliary current flows from said current transformer to the field winding of the motor driving the slipping wheel.

2. The improvement as defined in claim 1 wherein said connecting means comprises optical coupling means having input and output terminals, said input terminals being connected for energization in response to the production of said wheel slip signal and said output terminals being connected to said amplifying means in a manner to inhibit operation thereof so long as said input signals are energized.

3. The system of claim 1 wherein said semiconductor means comprises inversely poled parallel connected thyristors.

4. The system of claim 1 wherein said amplifying means comprises a plural stage amplifier having an emitter follower output stage.

5. The system of claim 1 wherein the semiconductor means are connected across the current transformer secondary winding which is connected to supply boost current to the field winding of the motor driving a slipping wheel.

* * * * *